United States Patent [19]
Fox
[11] 3,765,895
[45] Oct. 16, 1973

[54] PHOTOGRAPHIC PRINT-OUT COMPOSITION CONTAINING A COLORLESS STABLE-FREE RADICAL PRECURSOR AND A PHOTOACTIVATOR

[75] Inventor: Charles J. Fox, Rochester, N.Y.
[73] Assignee: Eastman Kodak Company, Rochester, N.Y.

[22] Filed: Nov. 22, 1971
[21] Appl. No.: 200,831

[52] U.S. Cl. .......................... 96/88, 96/91 R, 96/75, 96/90 R
[51] Int. Cl. ............................ G03c 1/00, G03c 1/52
[58] Field of Search ........................ 96/88, 89, 90 R, 96/91 R, 115 R

[56] References Cited

UNITED STATES PATENTS

| | | | |
|---|---|---|---|
| 3,445,234 | 5/1969 | Cescon et al. | 96/90 R |
| 3,373,021 | 3/1968 | Adams et al. | 96/91 R |
| 3,573,051 | 3/1971 | Gray | 96/91 R |
| 3,434,833 | 3/1969 | Fox | 96/115 R |
| 3,600,168 | 8/1971 | Lawton | 96/90 X |

*Primary Examiner*—Norman G. Torchin
*Assistant Examiner*—Won H. Louie, Jr.
*Attorney*—Robert W. Hampton et al.

[57] ABSTRACT

Photographic compositions including the combination of a substantially colorless stable-free radical precursor and at least one photoactivator which reacts with the free radical precursor upon exposure to activating rays, produce a colored, stable-free radical in the exposed areas directly on exposure. These printout elements can be carried on a support to form photographic printout elements.

6 Claims, No Drawings

PHOTOGRAPHIC PRINT-OUT COMPOSITION CONTAINING A COLORLESS STABLE-FREE RADICAL PRECURSOR AND A PHOTOACTIVATOR

FIELD OF THE INVENTION

This invention relates to photographic printout compositions and elements and more specifically to such compositions and elements which comprise a substantially colorless stable-free radical precursor and at least one activator which, on exposure to activating rays, forms a species that reacts with the free radical precursor to yield a colored, stable-free radical in exposed regions.

DESCRIPTION OF THE PRIOR ART

General reference to the use of stable-free radicals in photographic bleachout systems has been made in papers presented by W. R. Bard at SPSE 2nd Symposium on Unconventional Photographic Systems, Washington, D. C. Oct. 26–28, 1967 and at the Society of Plastics Engineers, Mid-Hudson Section November, 1967. Patents relating to this subject area are U.S. Pat. No. 3,600,168, Canadian Pat. No. 874,372 and British Pat. No. 1,213,823.

The use of stable-free radicals as sensitizers to increase the photoresponsive characteristics of photoconductive insulating compositions and photohardenable polymer compositions is described in U.S. Pat. No. 3,434,833 to Fox issued Mar. 25, 1969.

Negative working direct imaging systems, i.e. those which are based on the formation of color or density in exposed areas which systems relate to combinations of a color generator with a photooxidant are: British Pat. No. 1,047,796; U.S. Pat. Nos. 3,359,109; 3,360,370; 3,395,018; 3,445,233; 3,445,234 and Canadian Pat. No. 798,260.

Furthermore, Canadian Pat. No. 822,049 discloses the use of light sensitive free radicals which are generated upon exposure to actinic radiation react with a color forming compound to produce areas of density in a negative system, and in a positive system a colored compound which is bleached to provide less density in the exposed areas.

Although many of these systems, as already described, make use of photo-imaging systems comprising a photoactive compound and a light insensitive compound which react to form a color change upon exposure to light, no systems have been developed which utilize color producing stable-free radical precursors to form the image.

A system of the present type overcomes many of the disadvantages exhibited by conventional printout materials, such as relatively high cost, instability of images which discolor and fade, and generate offensive odors or poisonous vapors making them either difficult to handle or of low speed, poor contrast or insufficient resolution. Furthermore, in many of the prior art systems, photoactivated compounds are halogenated organic compounds that are generally extremely volatile and poisonous.

Accordingly, an object of this invention is to provide new photographic printout compositions and elements.

Another object of this invention is to provide novel photographic printout compositions and elements that include a stable free radical precursor and a photoactivator that, on exposure to activating rays, yields a species that can react with the free radical precursor to form a colored, stable free radical.

These and other objects nad advantages of the present invention will become increasingly apparent from a reading of the following specification and appended claims.

SUMMARY OF THE INVENTION

The objects of this invention are accomplished through the use of photographic printout compositions that include a substantially colorless stable-free radical precursor and at least one additional compound which when activated by suitable electromagnetic rays, e.g., light, leads to the formation of a colored stable-free radical in the exposed areas. Thus, the compositions contain a chemical compound which is a precursor of the colored, stable-free radical and one or more components which, upon exposure, react with the stable-free radical precursor to form the colored stable-free radical. The compositions can be carried on support materials to prepare photographic printout elements.

DESCRIPTION OF PREFERRED EMBODIMENTS

The present invention relates to photographic printout compositions comprising a substantially colorless stable-free radical precursor and a photoactivator which, on exposure to activating rays, e.g., ultraviolet light, actinic rays, visible light, etc., yields a species that reacts with the free radical precursor to produce a colored, stable-free radical in exposed regions of the composition.

The nature of the stable-free radical precursors useful herein is such that the free radical formed from it upon reaction with the photoactivator, described hereinafter, is stable in the resulting system; thus, the stable-free radical does not react with itself or with other components of the system or undergo one or another form of degradation. The colored, stable-free radical thus formed absorbs sufficient light to provide increased density in the exposed areas wherein the free radical is present.

Precursors of stable-free radicals which have been found useful according to preferred embodiment of the present invention include the following:

1. 1,1-diphenyl-2-picrylhydrazine

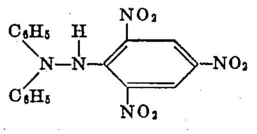

2. 4,4′-dihydroxy-3,5,3′,5′-tetra-t-butyldiphenylmethane

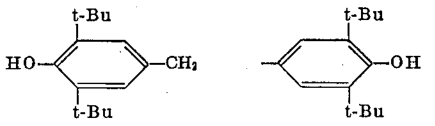

3. 1,3-dihydroxy-4,4,5,5-tetramethyl-2-phenyltetrahydroimidazole

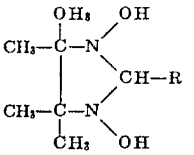

where R represents an aminoaryl group, 4. 2,4,6-tri-t-butylphenol

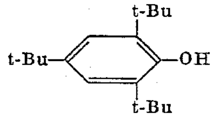

Additional stable-free radicals which are formed from free radicals precursors upon reaction with the photoactivators described hereinafter are described in "Organic Chemistry of Stable Free Radicals," A. R. Forrester, J. M. Hary, R. H. Thomson, Academic Press, London and New York, 1968 and include; triarylmethyl and other carbon radicals; diarylamino radicals, hydrazyls; nitroxides; aminium salts; Wuster salts; pyridinyls and viologens; nitro radical-anions and aroxyl radicals.

A specifically preferred class of free radical precursors which have found specific utility in the imaging systems described in the present invention are aminoaryl-substituted 1,3-dihydroxytetrahydroimidazoles having the following generic formula and whose preparation is described in copending U.S. Pat. application Ser. No. 119,052 filed Feb. 25, 1971;

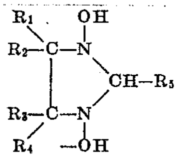

Stable Free Radical Precursor wherein:

a. each of $R_1$, $R_2$, $R_3$ and $R_4$ independently represents one of an alkyl group, an alkoxy group or an aryl group, and b. $R_5$ represents an aminoaryl group having from 6 to 14 atoms in a mono- or polycyclic aromatic nucleus, with the amino moiety having the formula

wherein each of $R_6$ and $R_7$ independently represents one of an alkyl group or an aryl group (preferably phenyl). In one preferred embodiment, $R_6$ and $R_7$ are alike.

As used herein, the term alkyl group includes straight or branched chain aliphatic groups having from one to eight carbon atoms in the carbon chain used to define the group nomenclature, such as methyl, ethyl, 2-chloroethyl, isopropyl, butyl, pentyl, heptyl, n-octyl, 7-methyloctyl and the like alkyl groups. Lower alkyl groups having one to four carbon atoms are preferred. The term alkoxy group refers to etherified alkyl groups, also designated alkyloxide groups, and include an alkyl moiety such as those described herein chemically bonded to an oxygen atom, for example, methoxy, ethoxy, propoxy, iosbutoxy, pentyloxy, n-octyloxy, etc. Lower alkoxy groups having from one to four carbon atoms are preferred. The term aryl group, as used herein, refers to and includes aromatic groups derived from mono- and polycyclic carbocyclic nuclei and having from six to 14 atoms in a mono- or polycyclic nucleus, such as phenyl, p-tolyl, naphthyl, anthryl, etc.

Upon reaction of these precursors with a suitable photo-activator stable-free radicals corresponding to the precursors and having the following generic structure are formed:

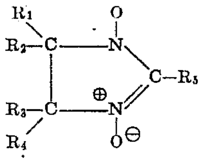

Included within this class are exemplary compounds like 1,3-dihydroxy-4,4,5,5-tetramethyl-2-(p-diphenylaminophenyl)tetrahydroimidazole,1,34,4,5,5-tetramethyl-2-(p-dimethylaminophenyl) tetrahydroimidazole and 1,3-dihydroxy-4,4,5,5-tetramethyl-2-(p-diethylaminophenyl)-tetrahydroimidazole.

Any of these classes of free radical precursors may be utilized in the present photographic printout compositions with one or more photoactivators of the type described below. The weight ratio of stable-free radical precursor to photoactivator generally ranges from about 1:0.1 to 1:500 and preferably from about 1:1 to 1:100.

The photosensitive compound (photoactivator) is activated upon exposure to electromagnetic rays, e.g., visible light, and in turn thereupon reacts with one of the above described stable-free radical precursors to produce the colored, stable-free radical of the type $$X - Y$$

which on exposure to light yields, it is theorized, at least one electron deficient species $$X$$

capable of abstracting the required element from the stable-free radical precursor to form the stable-free radical. A second species Y· which is thought to be formed from XY may or may not be electron deficient and thus may or may not be involved in stable-free radical formation. Preferably the photoactivator is a compound such as:

1. 2,2'-azobis[2-methylpropionitrile] $(Ch_3)_2C(CN)N{=}NC(CN)C(CH_3)_2$ 2. 1,2'-bis-2,4,5-triphenylimidazoles

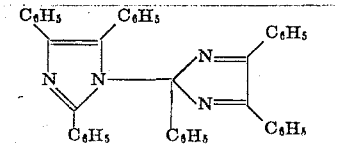

3. 2,2'-bis-2,4,5-triphenylimidazole

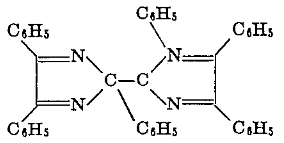

4. 1,1'-bis-2,4,5-triphenylimidazole

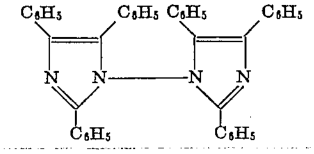

5. 2-(o-chlorophenyl)-4,5-diphenylbiimidazole

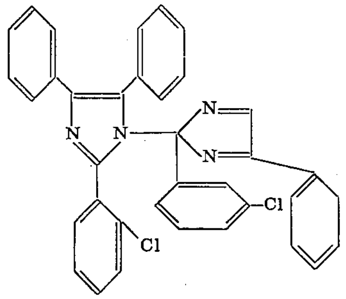

6. 4-diethylaminobenzenediazonium tetrafluoroborate, hexafluorophosphate, tetrachlorozincate or other slats

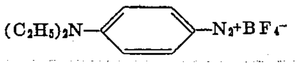

7. N,N-bis(4-diphenylaminobenzylidene) hydrozine

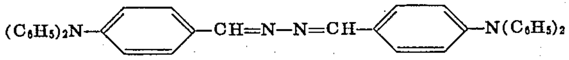

8. 2-anilinovinyl-1-methoxypyridinium p-toluenesulfonate

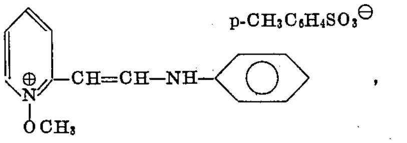

or

9. Benzoyl peroxide

Generally, any one or more of the above-described photo-activators may be used in combination with the aforementioned stable-free radical precursors in the weight ratios described above so that upon exposure to activating rays the colored, stable-free radicals are formed.

In order to provide a more versatile photographic material such as, for example a direct print material, the stable-free radical precursor and photoactivator material which form the photosensitive medium can be dissolved to form a coating solution, generally including a polymeric binder, which is then coated onto a suitable support or cast or extruded into a self-supporting film and dried. Care must of course be exercised to insure that the optional polymeric matrix which can constitute a binder for the precursor and photoactivators as well as the solvent therefor and the support upon which the dope is coated do not react with either the precursor or the photoactivator. Among the polymeric binders which have been found useful in the successful practice of the present invention are cellulose ester resins as for example cellulose acetate, cellulose acetate butyrate, cellulose acetate propionate, polyester materials, especially poly(ethylene terephthalate), polyvinyl and polyolefin resins all of which may be formed into coating solutions using conventional "non-reactive" solvents such as the alcohols, acetone, methylene chloride, naptha and a wide variety of other materials, or alternatively formed by casting or extrusion into thin films which need no support.

If a support is utilized for the photographic elements of the present type, any conventional photographic support material including paper and the resinous supports which are well known in the photographic arts can be used to advantage.

The relative quantities of the stable-free radical precursor, the photoactivator and the resin which can be used is largely a matter of choice depending upon the strength of the dried film-forming binder material and the color density desired in the exposed areas. Generally, however, the amounts of precursor and photoactivator will be small in comparison to the amount of binder material. Typically, however, the combined free radical precursor and photoactivator are present in the element at concentrations of from about 1 to about 90 weight percent and preferably from about 2 to about 60 weight percent.

If desired, conventional photographic binders, for example, gelatin can be used to provide a matrix for the precursor and activator materials. Similarly, the precursor and activator can be included in a porous substrate without a binder, using methods such as imbibition.

After a composite direct print photographic element of the present type is prepared, it can be imagewise exposed, using well-known methods, to activating rays for the photoactivator, whereupon an image forms in exposed regions without further processing.

The following examples are provided to further illustrate the present invention.

EXAMPLE I

A dope photographic printout composition is prepared by dissolving 0.04 g. of 1,1-diphenyl-2-picrylhydrazine and 0.05 g. of 4-diethylaminobenzenediazonium tetrafluoroborate plus 2 g. of cellulose acetate butyrate in 5 ml. of 2-methoxyethanol and 15 ml. of methylene chloride. This solution is then coated on a paper support at a wet thickness of 0.005 inches to prepare a photo-graphic printout element. When dry, a portion of the coating is imagewise exposed in the exposure unit of a commerical diazo printer, containing a mercury source. The coating changes from off-white to violet in the exposed area but remains off-white in unexposed areas.

EXAMPLE II

The procedure of Example I is used to prepare and expose a photographic printout element, except that the diazonium salt is replaced by 0.33 g. of 2,2′-azo bis[2-methyl-propionitrile]. The coating changes from off-white to violet in the exposed areas but remains unchanged in the unexposed areas.

EXAMPLE III

A procedure like that of Example I is used to prepare and expose a photographic printout element, except that the diazonium salt is replaced by 0.13 g. of 2-[p-chlorophenyl]-4,5-diphenylbimidazole. The coating changes from off-white to violet in exposed areas but remains unchanged in unexposed areas.

EXAMPLE IV

A procedure like that of Example I is used to prepare and expose a photographic printout element, except that the diazonium salt is replaced by 0.54 g. of 4-diphenylaminophenylazine. The coating changes from yellow to brown in exposed areas but remains unchanged in unexposed areas.

EXAMPLE V

A procedure like that of Example III Is used to prepare and expose a photographic printout element, except that .04 g. of 1,3-dihydroxy-4,4,5,5-tetramethyl-2-(p-dimethylaminophenyl) tetrahydroimidazole is used in place of 1.1-diphenyl-2-picrylhydrazine. The coating changes from off-white to blue in exposed areas but remains unchanged in unexposed areas.

Other ingredients may also be added to the photographic printout composition of the present invention to improve various aspects and characteristics thereof.

For example, stabilization of the image may be accomplished by eliminating the residual photosensitive component from the unexposed areas thereby precluding its further reaction with the stable-free radical precursor. This may be accomplished by reacting this residual photosensitive component with a more active species which is generated at an entirely different wavelength (perhaps in the visible region of the spectrum) than initially employed for image formation. Such a species could be generated by photolysis of benzophenone with benzhydrol; benzophenone with polyethylene glycol; or pyrene-1,8-dione with polyethylene glycol. A sensitizer, for example, 7-diethylaminocoumarin could be used to promote the sensitivity of the latter photo-reaction farther towards the visible region of the spectrum. Matting agents, optical brighteners, plasticizers, etc. might also be added so long as they do not react with the stable-free radical formed or themselves chemically initiate free radical formation.

The invention has been described in detail with particular reference to certain preferred embodiments thereof, but it will be understood that variations and modifications can be effected within the spirit and scope of the invention.

There is claimed:

1. A photographic printout composition comprising a substantially colorless stable-free radical precursor selected from the group consisting of 1,1-diphenyl-2-picrylhydrazine, 4,4′-dihydroxy-3,4,3′,5′-tetra-t-butyldiphenylmethane, 1,3-dihydroxy-4,4,5,5-tetramethyl-2-(p-dimethylaminophenyl) tetrahydroimidazole or 2,4,6-tri-t-butylphenol and a photoactivator selected from the group consisting of 2,2′-azobis[2-methylpro-pionitrile], 1,2′-bis-2,4,5-triphenylimidazole, 2,2′-bis-2,4,5-triphenylimidazole, 1,1′-bis-2,4,5-triphenylimidazole, 2-(o-chlorophenyl)-4,5-diphenylbiimidazole, 4-diethylaminobenzene diazonium salts, N,N′-bis(4-diphenylaminobenzylidene)-hydrazines, 2-anilinovinyl-1-methoxypyridinium salts or benzoyl peroxides.

2. A photographic printout composition as described in claim 1 wherein the mole ratio of said stable-free radical precursor to said photoactivator ranges from about 1:0.1 to about 1:500.

3. A photographic printout composition as described in claim 1 and further comprising a film-forming polymeric binder.

4. A photographic element comprising a support having thereon a photographic printout composition as described in claim 1.

5. A photographic element as described in claim 4 wherein said support is porous and said photographic printout composition is imbibed into the pores thereof.

6. A photographic element comprising a support having thereon a photographic printout composition containing a 2-amino-phenyl-1,3-dihydroxy tetrahydroimidazole stable free radical precursor and a photoactivator selected from the group consisting of a 4-dialkylaminobenzene diazonium salt, a 2,2′-azobis (2-methylpropionitrile), a 2-(p-chlorophenyl)-4,5-diphenylbiimidazole and a N,N′-bis(4-diphenylaminobenzylidene) hydrazine, said stable free radical precursor having the following generic formula:

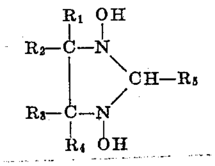

wherein:

a. each of $R_1$, $R_2$, $R_3$ and $R_4$ independently represents one of an alkyl group having from one to eight carbon atoms, an alkoxy group or an aryl group having from six to 14 atoms in a mono- or polycyclic nucleus, and b. $R_5$ represents an aminoaryl group having from six to 14 atoms in a mono- or polycyclic aromatic nucleus with the amino moiety having the formula

wherein each of $R_6$ and $R_7$ independently represents one of an alkyl group of an aryl group.

* * * * *